Patented Apr. 7, 1942

2,278,475

UNITED STATES PATENT OFFICE 2,278,475

BAKED BEANS AND SIMILAR BAKED PRODUCTS

Albert Musher, New York, N. Y., assignor, by mesne assignments, to Food Manufacturing Corporation, Chicago, Ill., a corporation of New York No Drawing. Application May 7, 1941,
Serial No. 392,344

4 Claims. (Cl. 99—186)

The present invention relates to baked beans and similar type products with a baked flavor.

In preparing baked beans it is necessary to give the beans a prolonged baking process either in the can or container in which the baked beans are distributed or sold, or prior to the canning or package sterilizing of the beans.

It has been found quite difficult to give a suitable baked taste, particularly within shorter periods of time, to many types of beans and to other types of similar products such as green or yellow peas, and so forth.

It is among the objects of the present invention to provide an improved method for obtaining baked beans, and particularly canned baked beans, without the necessity of resorting to prolonged baking treatments.

Still further objects and advantages will appear from the more detailed description set forth below, it being understood, however, that this more detailed description is given by way of illustration and explanation only, and not by way of limitation, since various changes therein may be made by those skilled in the art without departing from the scope and spirit of the present invention.

In accomplishing the above objects it has been found satisfactory, prior to a relatively short or reduced baking treatment, to subject the beans to an explosion treatment. In many cases, following this explosion treatment, a satisfactory baked flavor in the beans may be produced without the baking treatment, but the baked flavor may be produced merely from the sterilizing process that is given to the beans while they are within the can.

In the carrying out of this invention, the blanching of the beans prior to the explosion treatment, but most generally after the explosion treatment, or even before and after the explosion treatment, may be utilized to enhance the resultant baked flavor or the improved procedure for producing the baked flavor. Either a dry or wet blanching treatment may be used.

In effecting the explosion procedure of this invention the beans that may be used are the commercially dried beans. If the beans that are used are not of the commercially dried variety then, prior to the explosion treatment, they should be dried either in the sun, or in a tray dryer, for example, until the water content is reduced, for example, to less than 15% to 20%, or to less than 10%. For the drying procedure temperatures ranging, for instance, from about 90° F. or 100° F. to about 160° F. or 180° F. may be utilized.

The beans which may be used are, for example, navy beans, blackeyed or China beans, lima beans, soya beans, marrow beans, lentils, kidney beans, etc.

These beans are placed in a closed chamber in which they are subjected to an elevated pressure ranging, for example, from between about 20 to 25 pounds per square inch to about 300 or 350 pounds per square inch, at a temperature ranging, for example, between about 250° F. and 550° F., and for a time period ranging, for instance from 3 to 10 seconds, to 5 or 6 minutes, or longer, depending upon the results desired, and the equipment and other conditions that are used. During this procedure the chamber may or may not be rotated as desired.

The chamber is then suddenly and instantaneously opened into a low pressure (preferably relatively unconfined) area, such as the atmosphere, whereupon the beans are ejected from the chamber and result in a cell or structure disrupted condition, with expansion generally taking place, but generally without substantial disintegration, shattering or disruption of the unity of the beans, depending upon the procedures used.

The pressure and temperature may be obtained by introducing saturated or superheated steam into the chamber, or if desired, the chamber may be externally heated, in which case steam may be admitted into the chamber or, the moisture content of the bean may be so regulated so that the moisture from within the bean will generate the necessary pressure. For various modifications and results in carrying out this invention the steam may be moist or dry.

Also, various flavoring materials such as salt, for example, or other flavoring materials, either dry or liquid, or water, may be admitted or placed into the chamber so as to become impregnated within the beans during this treatment or so as to otherwise modify the resulting product.

With reference to this explosion or expansion procedure, it is also possible to cook in water or other liquids, to steam, freeze, dry roast or oil roast, multiple explode, enzyme treat, water wash or water soak the beans in order to obtain the specific results required as, for example, in order to produce a more tender bean, or, in order to modify or enhance the cell disruption or structure disruption of the bean. Also, various combinations of these embodiments may be utilized at different places in the procedure.

Wherever the beans are to be exploded following any of these embodiments in which water or moisture is used, it generally will be necessary to dry the beans as herein described prior to the subsequent explosion treatment.

Where the beans are frozen so as to enhance the cell or structure disruption of the beans, they should be given a slow freeze so as to build up relatively large ice crystals therein, so as thereby to aid in the disruption of the cell or structure. Also, for this freezing procedure, the beans should have sufficient moisture within them so as to enable the formation of ice crystals of sufficiently large size. If necessary, steaming, water boiling, or other moisture absorption treatments may be used to incorporate a sufficient quantity of water within the beans before the freezing procedure.

The advantage of using the multiple explosion treatment in the processing of the beans is that lower temperatures and lower pressures may be utilized than would have to be used to produce relatively the same results if a single explosion were used. In the carrying out of multiple explosions, the explosion or chamber treatment above described is repeated one or more times. These repeated treatments may be carried on at the same temperatures and pressures, at higher temperatures and pressures, at lower temperatures and pressures, or at variable temperatures and pressures than the original explosion.

An advantage of the multiple explosion treatment is that beans of increased porosity or expansion or tenderized quality may be produced without burnt or scorched flavor, particularly where it is desired to have substantial expansion, or structure disruption, etc., of the beans.

The water soaking of the beans prior to the explosion treatment, or at other points during this process, may be of advantage in various cases in tenderizing the beans prior to the explosion, or in de-starching or de-proteinizing the beans so as to enable improved qualities in the resultant beans. The water of this water soaking procedure may be either plain water, salted water, or alkalized or acidified water, etc. Of course, wherever moisture is used, the beans should be dried, prior to the explosion treatment, in accord with the procedure herein given.

Following the procedure outlined herein, the exploded beans of this invention are then given a baking treatment in an oven or in similar baking equipment, this baking taking place either with or without a sauce, as desired. It will be noted, however, that an enhanced baked flavor in the beans will result with decreased baking time periods.

In fact, in various cases, the baking procedure may be eliminated but the sterilization of the beans in the cans may be depended upon, solely, to provide a baked flavor in the beans. This result is entirely unusual and unexpected.

The enhancement of the baked flavor in the beans in the carrying out of this invention is substantially improved by blanching the beans either before the explosion procedure or generally after the explosion procedure. If desired, the beans may be blanched both before and after the explosion procedure.

Also, the use of superheated steam in conjunction with the explosion procedure is an embodiment of importance in producing an enhanced baked quality and flavor in the beans.

Following the treatment herein outlined, the beans are placed in cans or other containers and are sealed. Following this, the beans are sterilized in the cans for the required period of time, and under the necessary pressure, depending upon the size cans that are used.

Not only does this invention provide an improvement in the baked quality or baked procedure of the beans but also, other advantages accrue. These advantages include the producing of a more tender bean, improvement in the flavor of the bean, or improved edibility or digestibility of the resultant bean.

For one specific example, dried beans of commerce are placed in a closed chamber and saturated steam is allowed to enter into the chamber so as to build up as quickly as possible a pressure of 215 pounds per square inch at a temperature of about 395° F. The beans are kept in the chamber under these conditions for a period of 40 seconds and immediately thereafter the chamber is suddenly opened to the atmosphere so as to result in an instantaneous drop in pressure and ejection of the beans.

The resultant beans are then blanched in warm water at 210° F. for about 3 minutes. After the blanching the beans are partially cooled with water and are then filled into #2 cans, the fill being 10.5 ounces.

The remainder of the can is then filled with a boiling brine solution composed of 15 pounds of salt for each 100 gallons of water. The cans are then closed and sterilized for 45 minutes at 240° F. and are then followed by a cooling with water to 95° F.

Wherever the canning procedure is referred to in this application this is meant to include any form of sterilizing and preserving of the beans as, for example, not only in cans, but also in jars or other types of containers that might be used for this purpose.

What is claimed is:

1. A method of producing beans having a baked flavor, said method comprising disrupting the structure of beans by subjecting them to steam at an elevated temperature and pressure followed by instantaneously reducing said temperature and pressure to a lower temperature and pressure, blanching the beans, and thereafter canning the beans.

2. A method of producing beans having a baked flavor, said method comprising disrupting the structure of beans by subjecting them to steam at an elevated temperature and pressure followed by instantaneously reducing said temperature and pressure to a lower temperature and pressure and thereafter canning the beans.

3. A method of producing beans having a baked flavor, said method comprising disrupting the structure of beans by subjecting them to steam at an elevated temperature and pressure followed by instantaneously reducing said temperature and pressure to a lower temperature and pressure, thereafter repeating at least one more time the procedure of subjecting the beans to steam at an elevated temperature and pressure followed by instantly reducing the temperature and pressure to a lower temperature and pressure, and thereafter canning the beans.

4. A method of producing beans having a baked flavor, said method comprising disrupting the structure of beans by subjecting them to steam at an elevated temperature and pressure followed by instantaneously reducing said temperature and pressure to a lower temperature and pressure, thereafter repeating at least one more time the procedure of subjecting the beans to steam at an elevated temperature and pressure followed by instantly reducing the temperature and pressure to a lower temperature and pressure, then blanching the beans, and thereafter canning the beans.

ALBERT MUSHER.